United States Patent [19]

Sulzbach

[11] Patent Number: 4,775,517
[45] Date of Patent: Oct. 4, 1988

[54] APPARATUS FOR THE PREPARATION OF A REACTION MIXTURE FROM LIQUID COMPONENTS

[75] Inventor: Hans-Michael Sulzbach, Koenigswinter, Fed. Rep. of Germany

[73] Assignee: Maschinenfabrik Hennecke GmbH, Leverkusen, Fed. Rep. of Germany

[21] Appl. No.: 50,163

[22] Filed: May 14, 1987

[30] Foreign Application Priority Data

May 31, 1986 [DE] Fed. Rep. of Germany ....... 3618395

[51] Int. Cl.⁴ ........................... B01F 5/04; B01F 15/02
[52] U.S. Cl. .................................... 422/133; 366/159; 366/173
[58] Field of Search ................ 422/224, 133; 366/137, 366/159, 173

[56] References Cited

U.S. PATENT DOCUMENTS

4,175,874 11/1979 Schneider ............................ 422/133
4,193,701 3/1980 Koch et al. ........................... 366/159

FOREIGN PATENT DOCUMENTS

3301911 7/1984 Fed. Rep. of Germany .

Primary Examiner—Michael S. Marcus
Attorney, Agent, or Firm—Gene Harsh; Joseph C. Gil

[57] ABSTRACT

The device of the present invention is used for the production of a reaction mixture. The device has a housing with a guide bore provided therein for an injection piston. Feed lines with entry openings and recirculation lines are provided. The device is also provided with a rotary slide valve which contains a mixing chamber through which the ejection piston can pass. The slide valve is movable to a position that frees the entry openings to the mixture chamber and to a position that connects the entry openings (through flow channels provided in the rotary slide valve) with the recirculation lines.

2 Claims, 4 Drawing Sheets

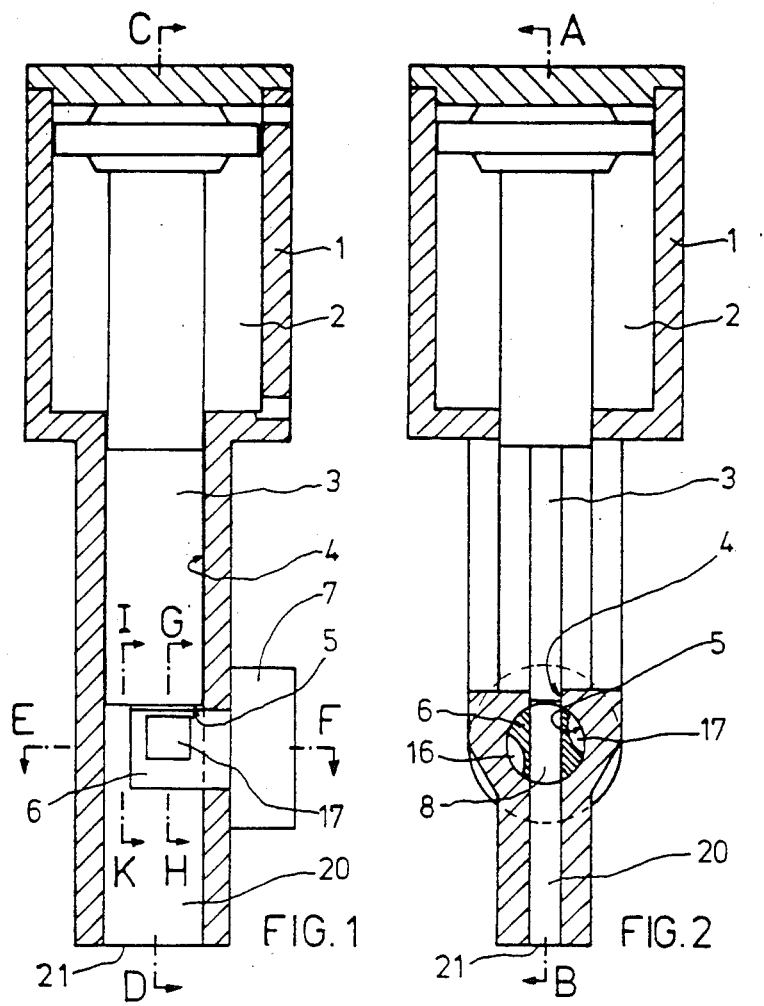
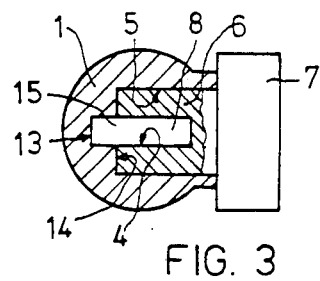
FIG. 1
FIG. 2
FIG. 3

APPARATUS FOR THE PREPARATION OF A REACTION MIXTURE FROM LIQUID COMPONENTS

BACKGROUND OF THE INVENTION

The present invention broadly relates to a device for the production of a reaction mixture which forms massive or foamed plastic materials from liquid components. The device has a housing with a guide bore provided therein for an ejection piston. Feed lines with entry openings and recirculation lines are provided. The device is also provided with a rotary slide valve, which contains a mixing chamber through which the ejection piston can pass. The slide valve is movable in a position that frees the entry openings to the mixing chamber to connect the entry openings through flow channels provided in the rotary slide valve with the recirculation lines.

A device of the above type, is described in German Offenlegungsschrift No. 33 01 911. The disclosed device has a rotary slide valve whose axis coincides with that of the mixing chamber, with the mixing chamber centrally arranged in the rotary slide valve. This rotary slide valve which has the shape of a sleeve has injection channels, which can be aligned with the feed lines by rotating. These injection channels must be cleaned through an extensive ejection mechanism after each mixing process. Such a cleaning control is quite costly. A major disadvantage of this device is that the mixing chamber is completely open toward the exit as in a common ejection piston mixhead and is consequently not suited for components that are difficult to mix.

It is the object of this invention to create a device of the above-mentioned type, which is less costly and is suitable for difficult mixing projects.

BRIEF DESCRIPTION OF THE DRAWINGS

FIG. 1 shows the device at a cut according to line A - B in FIG. 2.

FIG. 2 shows the device at a cut according to line C - D in FIG. 1.

FIG. 3 shows the device at a cut according to line E - F in FIG. 1.

DESCRIPTION OF THE INVENTION

Figure 4:
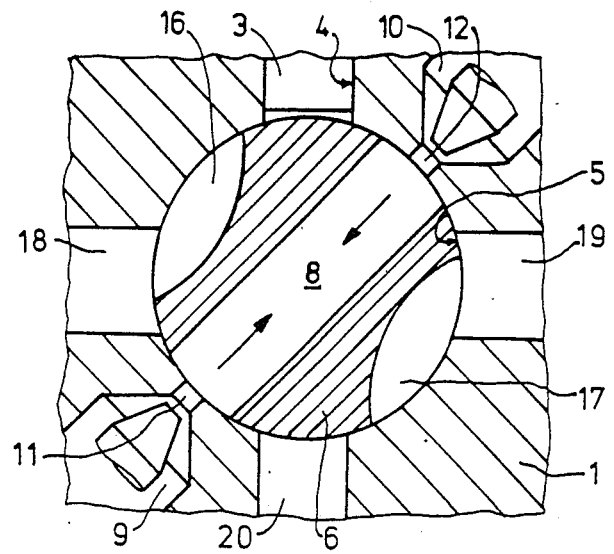
FIG. 4 shows an enlargement of a cut according to line G - H in FIG. 1, with the rotary slide valve in mixing position

The above problem is solved by arranging the rotary slide valve in a guide bore at an angle to the guide bore of the ejection piston and only partially extending the slide valve into the guide bore of the ejection piston. Thus, the mixing chamber always has an opening in the axial direction of the rotary slide valve to the remaining area of the guide bore of the ejection piston.

More particularly, the present invention is directed to an apparatus for the preparation of a reaction mixture from two or more liquid components comprising
  (a) a housing,
  (b) a first guide bore located in said housing and passing through said housing,
  (c) a second guide bore located in said housing, said second guide bore intersecting and partially extending into said first guide bore,
  (d) at least four passageways in said housing, said passageways opening into said second guide bore, and wherein at least two of said passageways are used for introduction of said liquid components into said apparatus, and wherein at least two of said passageways are used for recirculation of said liquid components,
  (e) a rotary slide valve in said second bore, said rotary slide valve
    (i) having a mixing chamber therein, said mixing chamber opening into said first bore in the axial direction of said rotary slide valve, and
    (ii) having recesses on the outer surface thereof,
  (f) a hydraulically driven ejection piston guided in said first bore, and wherein said apparatus operates as follows:
  (g) for mixing of the liquid components, said slide valve is oriented such that the passageways for introduction of liquid components open into said mixing chamber, and
  (h) for recirculation of the liquid components, said slide valve is oriented such that the passageways for introduction of liquid components and the passageways for recirculation are connected via said recesses, and such that said ejection piston is capable of passing through said mixing chamber.

The construction of the present apparatus insures that the entry openings, at the proper position of the rotary slide valve, open directly into the mixing chamber, which means that no cleaning pistons are required. In the mixing position, the mixing chamber (which is located in the rotary slide valve) is at an angle to the guide bore of the ejection piston. Since the diameter of the rotary slide valve is larger than the width of the guide bore of the ejection piston, a portion of the front opening of the mixing chamber is covered by the housing wall, so that the exit opening of the mixing chamber represents a throttle point. This results in particularly good post-mixing. Since the guide bore of the ejection piston immediately expands below the rotary slide valve, the flow then immediately becomes calm, which results in the desired laminar flow of the reaction mixture into a subsequently arranged mold cavity of a molding tool.

The end points of the stroke motion of the ejection piston will be set so that one lies directly above the rotary slide valve and the other one is aligned with the end of the first guide bore, that is, its exit opening.

The distance between the exit opening of the first guide bore and the rotary slide valve can be freely selected within reasonable limits. It should be long enough to sufficiently calm down the turbulent flow coming from the mixing chamber, but it should not be too long. If the distance is too long, the relatively thin ejection piston may buckle if it sticks to the wall of the guide bore.

The rotary slide valve can be moved to three positions: the mixing position, the cleaning position and the recirculation position.

In practice, however, it is preferred that the geometry will be selected so that the recirculation and cleaning positions are one and the same.

Preferably, the ejection piston and its guide bore have a rectangular cross section and the mixing chamber is designed correspondingly. Other cross section shapes, of course, are also possible, for example circular ones, elliptical or triangle shapes, two over cutting circular cross sections or two circular cross sections connected through a channel, and so on. All of these versions effect the throttle point, or its special design.

The drawing shows a schematic of an embodiment of the new device and is explained in detail in the following.

Figure 5:
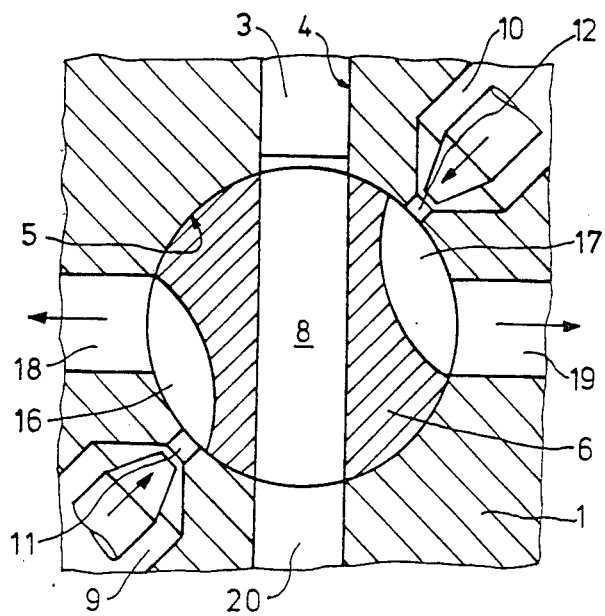
FIG. 5 shows the same cut as in FIG. 4, but the rotary slide valve is in the recirculation position.
Figure 6:
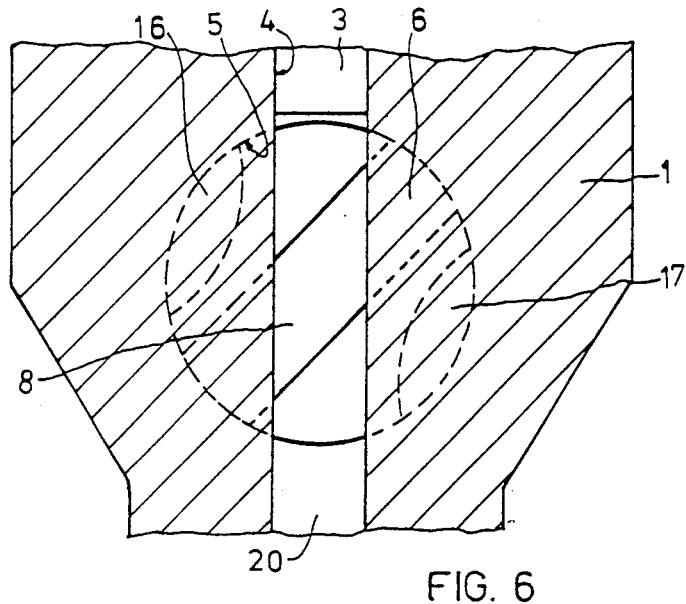
FIG. 6 shows an enlargement of a cut according to line I - K in FIG. 1, with the rotary slide valve in mixing position
Figure 7:
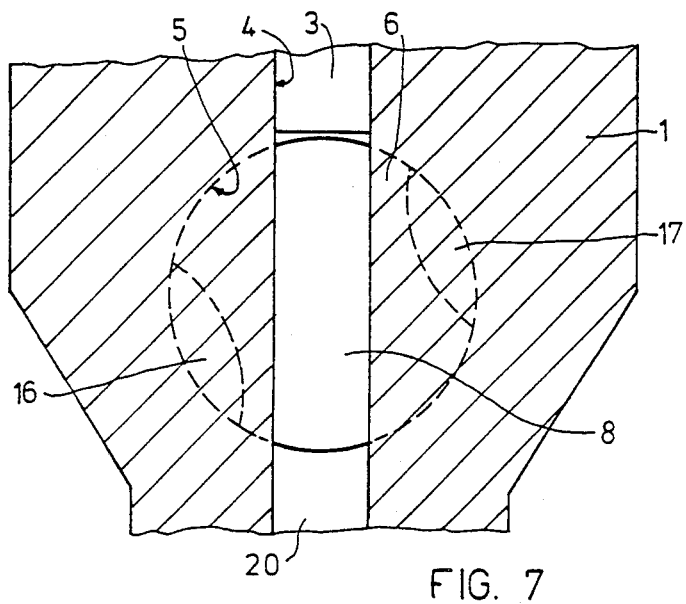
FIG. 7 shows the same cut as in FIG. 6, but the rotary slide valve is in recirculation position.

In FIGS. 1 to 7, a hydraulically driven ejection piston 3 (2 represents the chamber for the hydraulic fluid) is arranged in a first guide bore 4 in housing 1. Intersecting the guide bore 4 is a second guide bor 5, which houses a rotary slide valve 6. Guide bore 5 only partially extends into guide bore 4. The rotary slide valve 6 is provided with a rotary drive 7 and also extends only partially into the guide bore 4. The guide bore 4 and the respective ejection piston 3 preferably have a rectangular cross section, with the largest cross sectional dimension parallel to the axis of the rotary slide 6. The rotary slide valve 6 has a cut-like recess, which represents a mixing chamber 8 which, in appropriate position (cleaning position) aligns with the guide bore 4 in a way such that the ejection piston 3 can be pushed through the mixing chamber 8 and thereby completely fills it. At the side of the housing, feed lines 9 and 10 with entry openings 11 and 12 lead into the guide bore 5. They are arranged so that they point directly at each other when the rotary slide valve 6 is in the mixing position. In the mixing position, the mixing chamber 8 opens at 15 into a portion 13 of the first guide bore 4. Since the front end of the mixing chamber is partially covered by the corresponding front side 14 of the housing 1, the exit opening 15 of the mixing chamber 8 is considerably smaller than the entire cross section of the mixing chamber 8. This exit opening 15 simultaneously represents the desired throttle point when in mixing position. In the recirculation position, the rotary slide valve 6 connects the feed openings 11 and 12 through channels 16 and 17 with recirculation lines 18 and 19. In this position the mixing chamber 8 exactly aligns with the guide bore 4 so that the ejection piston 3 can pass through the mixing chamber 8 and through the cross section 20 of the guide bore 4 up to the exit bole 21.

Figure 8:
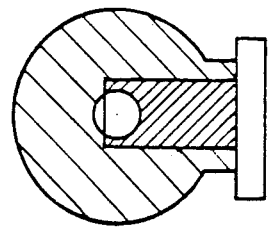
FIGS. 8 to 12 show various other versions of the ejection piston, guide bore, and mixing chamber cross section.
Figure 9:
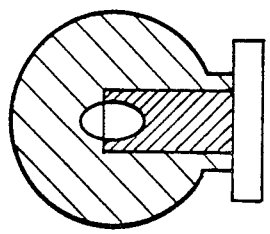
Figure 10:
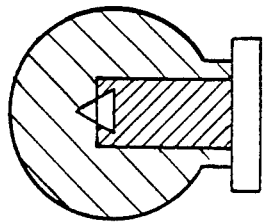
Figure 11:
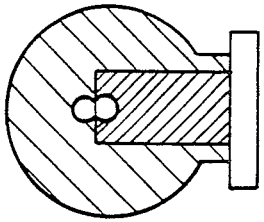
Figure 12:
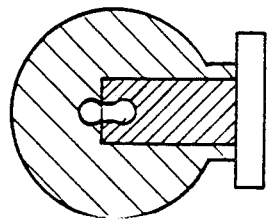

The cross sections shown in FIGS. 8 to 12 are self-explanatory. Depending on the size of the device or depending on whether the device is to be used to mix a system that is difficult to mix, one or the other cross sectional shape may be better suited based on he flow conditions created by the cross sections.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the preparation of a reaction mixture from two or more liquid components which forms massive or foamed plastic materials comprising
   (a) a housing,
   (b) a first guide bore located in said housing and passing through said housing,
   (c) a second guide bore located in said housing, said second guide bore intersecting and partially extending into said guide bore,
   (d) at least four passageways in said housing, said passageways opening into said second guide bore, and wherein at least two of said passageways are used for introduction of said liquid components into said apparatus, and wherein at least two of said passageways are used for recirculation of said liquid components,
   (e) a rotary slide valve in said second bore, said rotary slide valve
      (i) having a mixing chamber therein, said mixing chamber opening into said first bore, and
      (ii) having recesses on the outer surface thereof,
   (f) a hydraulically driven ejection piston guided in said first bore,
   (g) said slide valve having a first position such that the passageways for introduction of liquid components open into said mixing chamber, and having a second position such that the passageways for introduction of liquid components and the passageways for recirculation are connected via said recesses, and such that said ejection piston is capable of passing through said mixing chamber.

2. The apparatus of claim 1, characterized in that said ejection piston, said first guide bore and said mixing chamber have a rectangular cross section.

* * * * *